United States Patent [19]

Tuszko et al.

[11] Patent Number: 5,273,647
[45] Date of Patent: Dec. 28, 1993

[54] NEGATIVE PRESSURE HYDROCYCLONE SEPARATION METHOD AND APPARATUS

[76] Inventors: Wlodzimierz J. Tuszko, 5959 Terra Bella La., Camarillo, Calif. 93012; Wojciech J. Tuszko, 918 4th St. #14, Santa Monica, Calif. 90403

[21] Appl. No.: 807,443

[22] Filed: Dec. 13, 1991

[51] Int. Cl.$^5$ .............................................. B01D 21/26
[52] U.S. Cl. ................... 210/221.2; 210/258; 210/512.1; 210/787; 209/144; 209/211; 55/459.1
[58] Field of Search ................... 210/221.2, 258, 512.1, 210/787; 209/144, 211; 55/459.1

[56] References Cited

U.S. PATENT DOCUMENTS

| | | |
|---|---|---|
| 453,105 | 5/1891 | Bretney . |
| 3,415,375 | 12/1968 | Wikdahl .............................. 210/512.1 |
| 4,055,486 | 10/1977 | Choi et al. ............................ 209/144 |
| 4,140,632 | 2/1979 | Boivin .................................. 210/84 |
| 4,279,743 | 7/1981 | Miller .................................. 209/211 |
| 4,303,526 | 12/1981 | Moro et al. ......................... 210/512.3 |
| 4,670,161 | 6/1987 | Hayatdavoudi ................... 210/512.1 |
| 4,786,412 | 11/1988 | Lister et al. ......................... 209/211 |
| 4,876,016 | 10/1989 | Young et al. ....................... 210/512.1 |
| 4,927,298 | 5/1990 | Tuszko et al. ...................... 209/211 |
| 5,133,861 | 7/1992 | Grieve ................................ 210/512.1 |

FOREIGN PATENT DOCUMENTS

2194208A 3/1988 United Kingdom .

*Primary Examiner*—Robert A. Dawson
*Assistant Examiner*—David Reifsnyder
*Attorney, Agent, or Firm*—Fulwider Patton Lee & Utecht

[57] ABSTRACT

The improved hydrocyclone separating method and apparatus provides negative pressure to feed the hydrocyclone and an artificial air core into hydrocyclone. Use of the negative feeding pressure allows reduction of the cyclone pressure drop and energy consumption. The water content in the underflow solid product is decreased. Use of the artificial air core allows to obtain a high separation efficiency. Use of this hydrocyclone allows extraction of solids from liquid before the feeding pump and therefore to prevent abrasion of it.

10 Claims, 1 Drawing Sheet

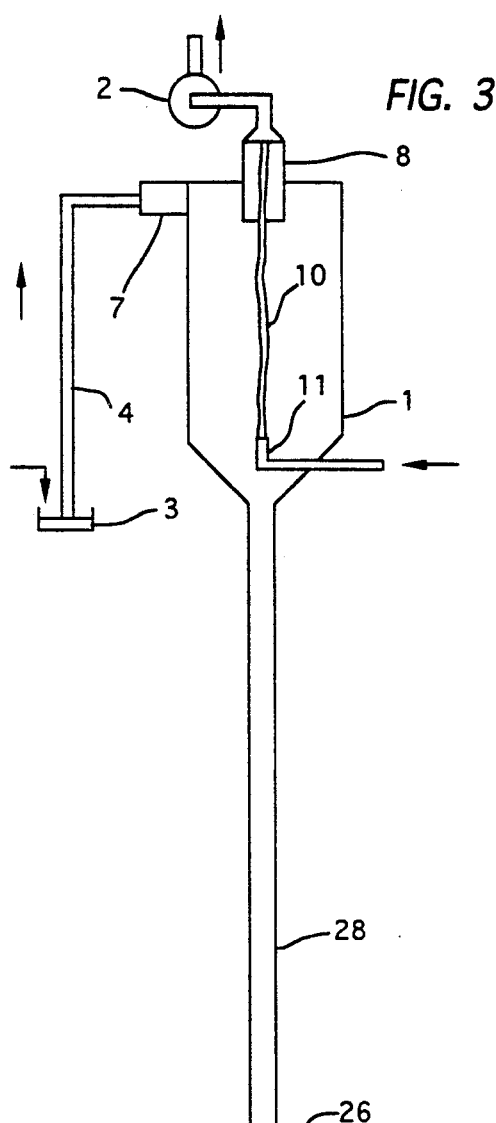
FIG. 1
FIG. 3
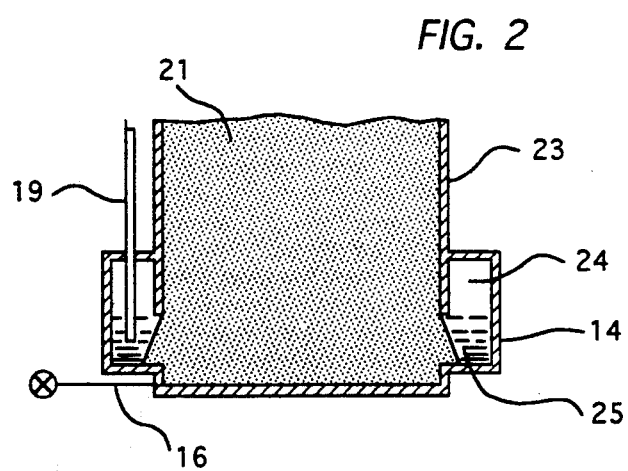
FIG. 2

5,273,647

NEGATIVE PRESSURE HYDROCYCLONE SEPARATION METHOD AND APPARATUS

FIELD OF THE INVENTION

This invention relates to a method and apparatus for centrifugally separating solid particles of foreign matter from a fluid. More particularly, this invention relates to devices for separating of particulate fluid suspensions known as a hydrocyclone, in which centrifugal forces of the revolving particulate suspension cause separation of the suspension into finer and coarser or lighter and denser fractions.

BACKGROUND

An early cyclone method and apparatus is known from U.S. Pat. No. 453,105 (Bretney) issued May 26, 1891. Various hydrocyclone separators have been described later in many patents. All those positive pressure hydrocyclones have low separation efficiency, high pressure drop and high water contents in underflow solid product. To increase the hydrocyclone separation efficiency, an artificial air core was invented (Wlodzinierz J. Tuszko et al, Patent No. 4,927,298 issued May 22, 1990). To increase the air cyclone (cyclone dust collector) separation efficiency an air core cyclone was invented (Wlodzinierz J. Tuszko et al, application of 07/360117 Ser. No. 07/651033 filed Jan. 30, 1991). Up to now, all hydrocyclone types were fed pressurewise that means the pump is pressing the feed suspension into the cyclone inlet. The air cyclone or cyclone dust collector can be fed pressurewise (positive pressure cyclone) as well as suctionwise (negative pressure cyclone). By then, negative pressure cyclone, the pump is sucking the feed suspension into the cyclone inlet. The inlet of the positive pressure cyclone is connected to the pressure pipe of the feeding pump air blower. The outlet of the negative pressure cyclone is connected to the suction pipe of the feeding blower. The negative pressure hydrocyclone was not used up to now apparently because there was no solution to take away the heavier or coarser product from the hydrocyclone's negative pressure interior and because of a low separation efficiency. The pressure drop of the present used positive pressure hydrocyclone generally ranges from 5 to 50 psig depending upon the particular hydrocyclone size and its capacity. The fluid content in the underflow solid product of this kind hydrocyclone is about 60% to 75%.

It would, therefore, be desirable to provide the negative pressure hydrocyclone to reduce the pressure loss called the pressure drop, between the cyclone inlet duct and exhaust pipe to reduce the energy consumption.

It would further be advantageous to exploit the negative pressure in hydrocyclone for a deep dewatering of the underflow solid product.

It would also be desirable to increase the operational life of the hydrocyclone feeding pump and to allow a feed pump to feed simultaneously both negative and positive pressure hydrocyclones.

It would further be desirable to allow for the use of the negative pressure hydrocyclone as a water cleaner for submerged pumps such as for cleaning water for agricultural purposes like irrigation.

SUMMARY OF INVENTION

More particularly, the invention is directed to an improved hydrocyclone method and apparatus and reduction of the costs of the separating process. Briefly and in general terms, the present invention provides a method and apparatus for the introductions of the negative pressure hydrocyclone with an artificial air core to reduce the pressure drop down to 3 psig, to decrease the fluid content in the underflow solid product down to 30% and to obtain the separation efficiency about 98%.

BRIEF DESCRIPTION OF THE DRAWINGS

FIG. 1 is a schematic diagram of one embodiment of the underflow solid product discharge with discharge container.

FIG. 2 is an enlarger view of the dewaterer of the hydrocyclone of FIG. 1.

FIG. 3 is a diagram of an alternative embodiment of the underflow solid product discharge with a barometric discharge column.

DETAILED DESCRIPTION OF THE PREFERRED EMBODIMENT

A first preferred method and apparatus for separation of particulate suspensions in a hydrocyclone which ensures a low pressure drop, a high separation efficiency and a low water content in underflow solid product of the hydrocyclone is illustrated in FIG. 1. The negative pressure hydrocyclone 1 is fed by a pump 2 from a feed sump 3 by means of an inlet pipe 4. The hydrocyclone 1 is comprised of an upper elongated cylindrical portion 5 and a conical lower portion 6. The cylindrical portion 5 includes an inlet duct 7 for introduction of a feed suspension from the sump 3 and inlet pipe 4, in a tangential direction to be centrifugally separated and an exhaust pipe 8 for an overflow stream of smaller or lighter solids. To this overflow exhaust pipe 8, the feeding pump 2 is connected so that it is sucking the feed from sump 3 throughout overflow exhaust pipe 8, cyclone 1, inlet duct 7 and inlet pipe 4. The bottom outlet 9 is for the underflow stream of a coarser or heavier solid. To maintain a high separation efficiency, an artificial air core 10 is created from small amount of atmospheric air introduced into the hydrocyclone along its axis by means of the air core bed duct 11. The coarse or heavy solids of the underflow solid product moves through the open channel 13 of the valve 12, the pipe 13, up to container 15, while the solid discharge valve 16, dewatering valves 17 and 18 on the dewatering pipe 19, and the atmospheric air inflow valve 20 are all closed. The dewatering pipe 19 connects the dewaterer 14 and the top of the container 15 with some point of a bigger negative pressure, like for example, the hydrocyclone exhaust pipe 8. While the container 15 is filling with the solids 21, all the elements 13, 15, 14 are under working pressure difference each of them in relation to the negative pressure in exhaust pipe 8. After the container 15 is filled with solids, the channel 13 is closed by valve 12, the valves 17 and 20 are opened. Then, all elements 13, 15, and 14 are under a bigger draining pressure difference. In the first stage of draining, the container 15, free water 22 is drawn up from the top of the container 15 to the hydrocyclone overflow exhaust pipe through the pipe 19. Then the drainage driving force is the difference between the positive atmospheric pressure in the open inflow valve 20 and negative pressure in the exhaust pipe 8. In the second stage of the draining, when the upper valve 17 is closed and the lower valve 18 is opened, the interspace water from solid 21 is removed down through the dewaterer 14.

Then the drainage driving force is the difference between the positive atmospheric pressure in the open inflow valve 20 and the negative pressure in the dewaterer 14. From this point, the water is moved up through the pipe 19 to the exhaust pipe 8. Then, the driving force is the difference between the negative pressure in exhaust pipe 8 and in the dewaterer 14. After the dewatering is achieved, the valve 18 is closed, the 20 remain open, the valve 16 is opened to discharge the collected and dewaterer solids 21. Parallel to the first container 15 should be built the second container 15 with all auxiliary equipment That means-with dewaterer, pipe and valves. That is the second twin container compartment. In the time when the first compartment is filled with the solids, the second compartment is drained. The valve 12 originates the change of the function of the two container compartments working for the same hydrocyclone.

The dewaterer 14 is built on the container 15 and has a bigger cross sectional area than the container 15. The details of the dewaterer are illustrated in the FIG. 2. The walls 23 of the container 15 extend down into the top portion of the dewaterer 14. Creating water-free space 24 and the water space 25. The water-free space 24 as in air pillow is created when the container 15 is filled. The bottom portion of the connection pipe 19 is in fluid communication with the water space 25. The dewaterer 14 is of a device, that can collect all the time the drain water and prevent the outlet of the pipe 19 to be clogged with the solid particles.

FIG. 3 is an alternative embodiment of the negative pressure hydrocyclone underflow product discharge with a barometric discharge column. The alternative embodiment comprises the negative pressure hydrocyclone 1 with air core 11, artificial air core 10, feeding pump 2, sump 3 and exhaust pipe 8. In this system a state of balance is created between the positive atmospheric pressure, provided on the water surface 26 in collector 27 of the solids 21 and negative pressure into the hydrocyclone 1, transmitted by the barometric discharge column 28. It is applied here, the same principle which is used to build the barometer.

The negative pressure hydrocyclone unit of the diameter 2.5 inch was built and tested in the cooperation with the discharge container as well as with the barometric discharge column. All features of the hydrocyclone given in this application were determined and checked in the tests. During the test, the hydrocyclone was working with Quartz-sand plus water suspension of the volume concentration about 15%. The following results were obtained: pressure drop 2.5 psig, water content in underflow solid product, about 30%, the separation efficiency about 98%.

This invention is not to be limited by the specific embodiment shown in the drawings or described in the description, which is given by way of example and not limitation, but only in accordance with the scope of the appended claims.

We claim:

1. In a hydrocyclone apparatus having an elongated upper cylindrical portion, a bottom conical portion, an inlet duct in the upper cylindrical portion for introduction of a water suspension with solid particles as a feed in a tangential direction, an exhaust pipe in the upper cylindrical portion for an overflow diluted suspension stream of lighter solid particles, and an underflow bottom outlet for a thickened suspension stream of heavier solid particles, the improvement in said hydrocyclone comprising:

a hydrocyclone feed suction pump connected to the exhaust pipe in the upper cylindrical portion for providing fluid suction to a feed sump through said inlet duct into the upper cylindrical portion;

an underflow product discharge outlet connected to a discharge container, said discharge container being connected to a source of negative pressure at a pressure below atmospheric pressure to collect solids from said bottom conical portion, and to drain free water form the top of said container and water from collected solids within said container, said container having a power dewatering portion including an upper air pillow space and a lower water collection space for collecting clean water for draining; and an air duct extending into the upper cylindrical portion to introduce a small amount of atomspheric air into the hydrocyclone along the axis of the hydrocyclone to create an artificial air core to obtain high separation efficiency.

2. The apparatus according to claim 1 wherein the underflow product discharge container comprises a water discharge valve and an air inlet valve for admitting air to said container when water is drained from said container.

3. The apparatus according to claim 2 wherein said source of negative pressure connected to said discharge container comprises a valved connection duct between the hydrocyclone exhaust pipe and the discharge container for communication of negative pressure from the exhaust pipe for draining water from the top of the discharge container and interspace water from solids collected in said discharge container.

4. The apparatus according to claim 2 further comprising an atmospheric air inflow valve connected to an upper portion of the discharge container to increase a pressure difference between said discharge container and said source of negative pressure and to accelerate dewatering.

5. The apparatus according to claim 2 wherein said discharge container comprises first and second compartments adapted to be alternatively filled and drained of water, such that while one of said compartments is being filled with solids the other of said compartments is being drained of water.

6. The apparatus according to claim 1 wherein the lower dewatering portion has a larger cross-sectional area than that of the discharge container, and the walls of the discharge container extend downwards into a top portion of the lower dewatering portion to define said upper air pillow space and said lower water collection space to collect water from said discharge container.

7. In a hydrocyclone apparatus having an elongated upper cylindrical portion, a bottom cylindrical portion, an inlet duct in the upper cylindrical portion for introduction of a water suspension containing solid particles as a feed in a tangential direction, an exhaust pipe in the upper cylindrical portion for an overflow diluted suspension stream of lighter solid particles, and an underflow bottom outlet for a thickened suspension stream of heavier solid particles, the improvement in said hydrocyclone comprising:

a hydrocyclone feed suction pump connected to the exhaust pipe in the upper cylindrical portion for providing fluid section to a feed sump through said inlet duct into the upper cylindrical portion;

an underflow product discharge outlet connected to a discharge container, said discharge container being connected to a valved connection duct between the hydrocyclone exhaust pipe and the discharge container for communication of negative pressure from the exhaust pipe for draining water from the top of the discharge container and interspace water from solids collected in said discharge container, and said discharge container including a water discharge valve and an air inlet valve for admitting air to said container when water is drained from said container; and an air duct extending into the upper cylindrical portion to introduce a small amount of atmospheric air into the hydrocyclone along the longitudinal axis of the hydrocyclone to create an artificial air core to obtain high separation efficiency.

8. The apparatus according to claim 7, further comprising an atmospheric air inflow valve connected to an upper portion of the discharge container to increase a pressure differential between said discharge container and said source of negative pressure, and to accelerate drainage of water from said discharge container.

9. The apparatus of claim 7, wherein said discharge container comprises first and second compartments adapted to be alternatingly filled and drained of water, such that while one of said compartments is being filled with solids, the other of said compartments is being drained off water.

10. The apparatus according to claim 7, wherein said discharge container includes a lower dewatering portion having an air pillow space and a water collection space for collecting clean water for draining, and wherein said lower dewatering portion has a larger cross-sectional area than that of the discharge container, and the walls of the discharge container extend downwards into a top portion of the lower dewatering portion to define said air pillow space and said lower water collection space to collect water from said discharge container.

* * * * *